W. M. AUSTIN.
VARIABLE STROKE INTERNAL COMBUSTION ENGINE.
APPLICATION FILED FEB. 3, 1916.
1,278,563.
Patented Sept. 10, 1918.
3 SHEETS—SHEET 1.
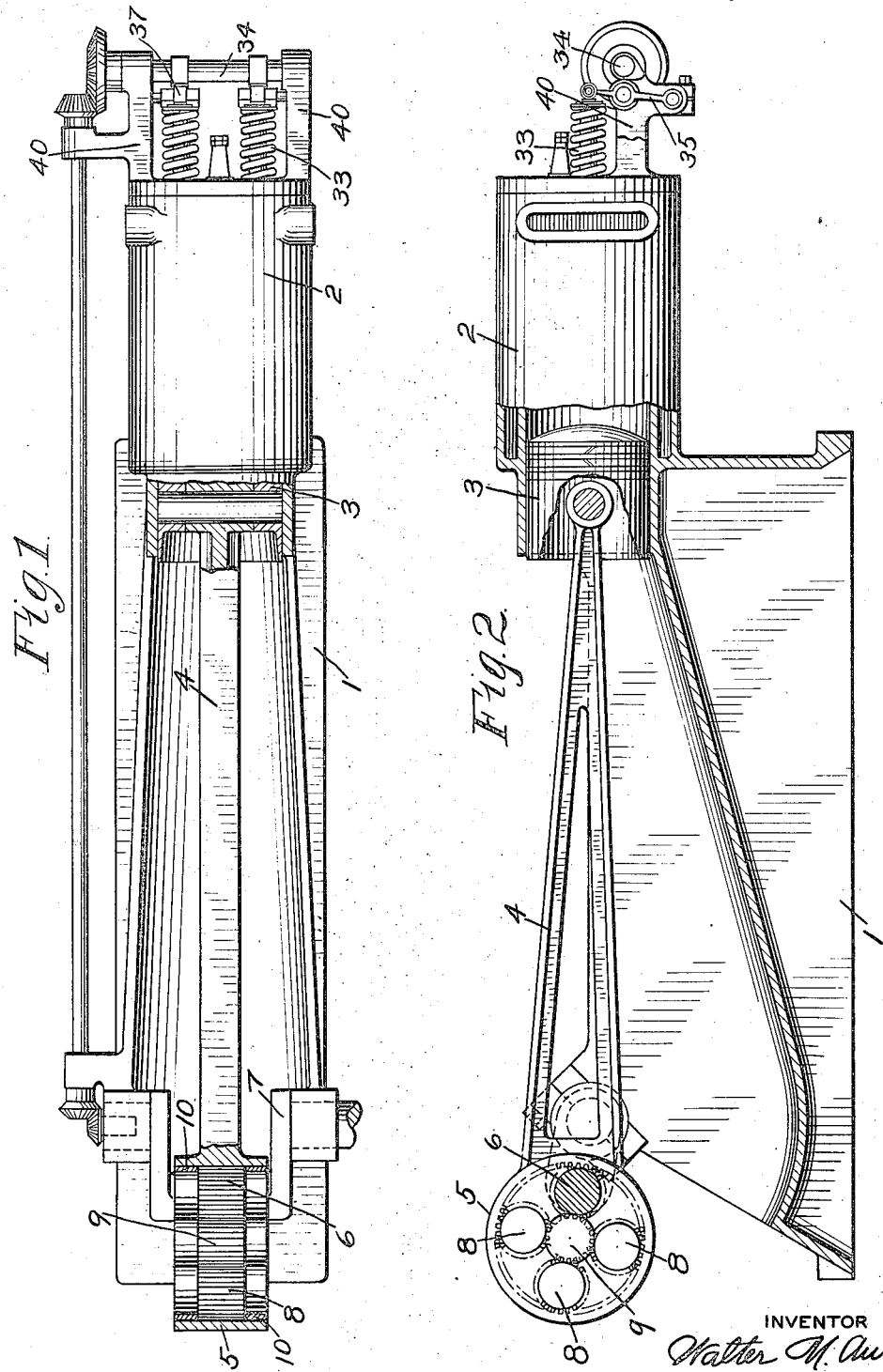

W. M. AUSTIN.
VARIABLE STROKE INTERNAL COMBUSTION ENGINE.
APPLICATION FILED FEB. 3, 1916.
1,278,563.
Patented Sept. 10, 1918.
3 SHEETS—SHEET 2.
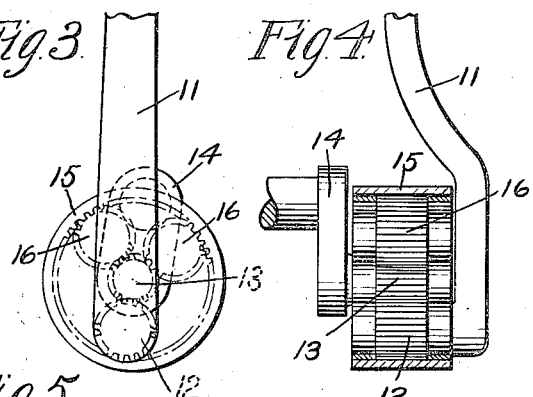
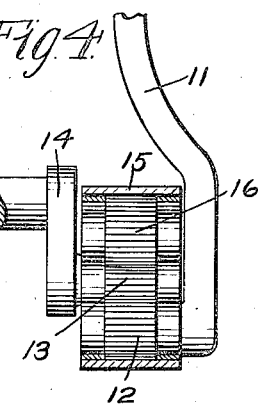
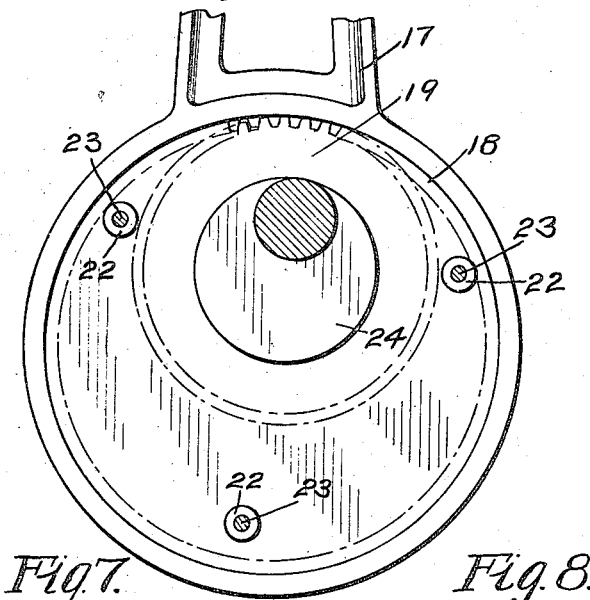
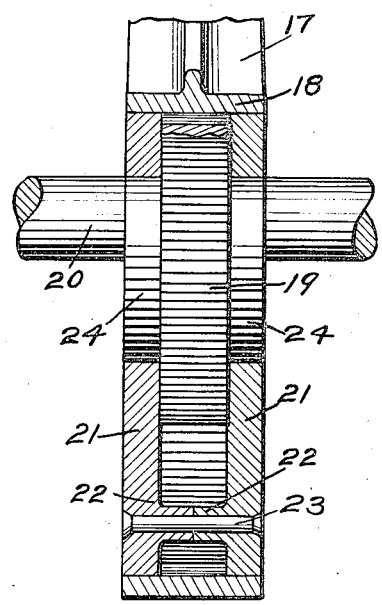
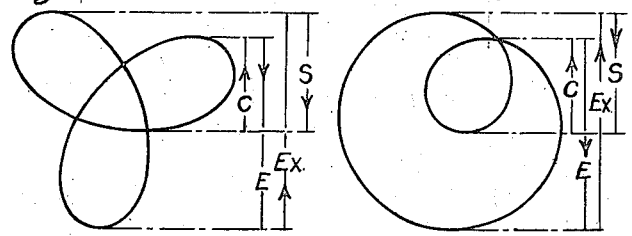
INVENTOR
Walter M. Austin
by Wm. M. Cady
Att'y.

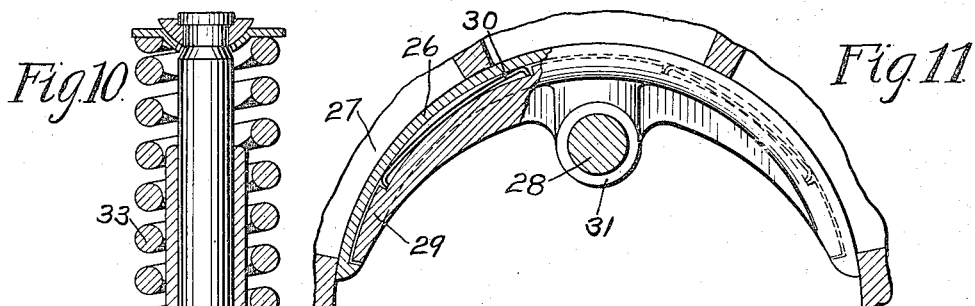
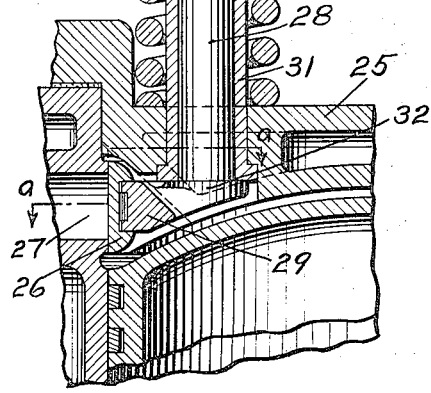
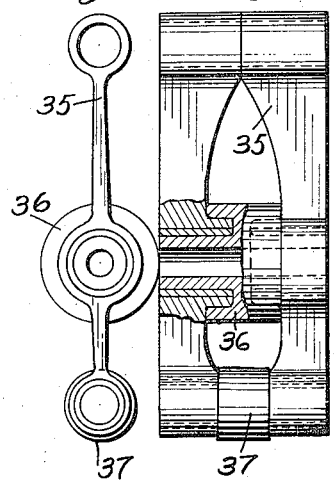
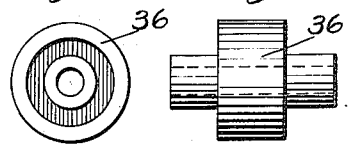
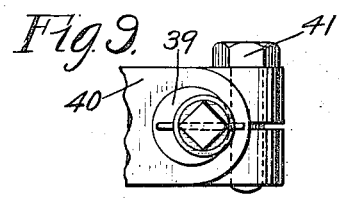
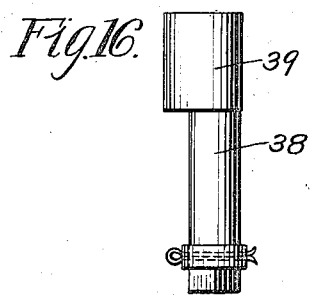

UNITED STATES PATENT OFFICE.

WALTER M. AUSTIN, OF SWISSVALE, PENNSYLVANIA.

VARIABLE-STROKE INTERNAL-COMBUSTION ENGINE.

1,278,563.  Specification of Letters Patent.  Patented Sept. 10, 1918.

Application filed February 3, 1916. Serial No. 75,954.

*To all whom it may concern:*

Be it known that I, WALTER M. AUSTIN, a citizen of the United States, residing at Swissvale, in the county of Allegheny and State of Pennsylvania, have invented new and useful Improvements in Variable-Stroke Internal-Combustion Engines, of which the following is a specification.

This invention relates to internal combustion engines, and more particularly to the type of four cycle engine which is provided with means for varying the stroke and thereby the clearance space, so that the clearance space is reduced to a minimum on the exhaust stroke to secure a more complete scavenging of the cylinder, the clearance space being increased at the end of the compression stroke to provide space for the compressed fuel.

One object of my invention is to provide an improved and simplified means for securing a variable stroke in an internal combustion engine.

Another object of my invention is to provide an improved valve construction particularly adapted for an internal combustion engine where the exhaust stroke completely scavenges the cylinder of the products of combustion.

Another object of my invention is to provide an improved valve operating mechanism for internal combustion engines.

In the accompanying drawings; Figure 1 is a plan view of an internal combustion engine, partly in section, showing my improvements embodied therein; Fig. 2 a side elevation thereof; Fig. 3 a side elevation of the crank pin end of a connecting rod, showing a modified form of variable stroke mechanism, Fig. 4 a front elevation thereof, partly in section; Fig. 5 a side elevation of the crank pin end of a connecting rod, showing another form of the variable stroke mechanism embodying my invention, with one of the side plates removed; Fig. 6 a vertical section thereof; Fig. 7 a diagram of the path described by the crank pin end of the connecting rod of the constructions shown in Figs. 1, 2, 5, and 6; Fig. 8 a similar diagram corresponding with the construction shown in Figs. 3 and 4; Fig. 9 a detail view of the adjustable support for the valve operating arm; Fig. 10 a vertical section of a portion of the engine, showing one of the valves constructed in accordance with my invention; Fig. 11 a transverse section on the line *a—a* of Fig. 10, with the cylinder head removed; Fig. 12 a side view of one of the valve operating levers; Fig. 13 a plan view thereof; Fig. 14 an end view of the roller for engaging the valve actuating cam; Fig. 15 a side view thereof; and Fig. 16 a side view of the valve lever supporting pin.

Referring to the feature of my invention for obtaining a variable piston stroke, a gear is provided on the crank shaft which is adapted to mesh with a gear on the connecting rod and a preferred form of construction embodying this feature is shown in Figs. 1 and 2 of the drawings, in which an internal combustion engine of the horizontal type is illustrated comprising a main casting 1 having a cylinder 2 containing piston 3 provided with a connecting rod 4.

The crank pin end of the connecting rod is made in the form of an internal gear 5 adapted to mesh with a spur gear 6, the teeth of which are cut in the crank pin of the crank 7.

In order to maintain the gear 6 in working engagement with the internal gear 5, idler gears 8, preferably three in number are mounted within internal gear 5 and engage the teeth thereof, a centrally arranged gear 9 being adapted to mesh with the gears 6 and 8.

As a further aid to maintaining the gears in working relation, I preferably provide roller bearings at opposite ends of the engaging gears. For this purpose, the teeth of the gears 6, 8, and 9 are only cut to the pitch line and the bearing faces at opposite sides of the respective gears are on the pitch line of the gears. The internal gear, on the other hand has only the tooth portion which is within the pitch line and after the teeth are cut the ends opposite the gear portion are filled in with annular bands 10 to the pitch line. It will thus be seen that rolling engagement on the pitch lines of the several gears is provided so that the parts are held snugly in position.

In order to obtain the desired relation between the different strokes of the engine, the number of teeth on the internal gear is three times the number of teeth on the crank pin gear.

With this arrangement, when the engine is running, the crank pin end of the connecting rod will describe the path shown in the diagram of Fig. 7, and while this does not take the eccentricity of the connecting rod into account, for all practical purposes, the movement of the piston 3 will correspond. Assuming that a charge of combustible mixture has been taken into the cylinder, the compression stroke will be as shown at C in Fig. 7. On the expansion stroke the piston moves as indicated at E and the exhaust stroke Ex follows, in which the cylinder is completely scavenged. The fuel charge is then drawn in on the suction stroke S, making the complete cycle.

Another construction for obtaining a variable stroke is shown in Figs. 3 and 4 of the drawings, in which the connecting rod 11 carries a spur gear 12 adapted to mesh with a spur gear 13 mounted on the crank pin 14.

An internal gear 15 meshes with the spur gear 12 and idler spur gears 16 are mounted within and mesh with the internal gear 15 as well as the spur gear 13 in order to maintain the gears in proper operative relation, the gears being preferably provided with pitch line bearing surfaces at opposite ends, as in the constructions shown in Figs. 1 and 2 of the drawings.

By this arrangement, substantially the same stroking is obtained, although the path of movement of the crank pin and of the connecting rod is different, being as shown in the diagram, Fig. 8.

Still another construction of the above character is shown in Figs. 5 and 6 of the drawings, in which the connecting rod 17 is provided at the crank pin end with an internal gear 18 adapted to mesh with a spur gear 19 mounted eccentrically on the crank shaft 20, the number of teeth on the gear 18 being one and one-half times the number of teeth on the gear 19.

In order to maintain the gears in operative relation, plates 21 may be mounted at opposite sides of the gear and having spacer lugs 22 for holding the plates apart when clamped by the bolts 23.

On opposite sides of the gear 19 are eccentric plates 24 concentric with the gear and adapted to bear within corresponding openings formed in the plates 21, so that as the parts rotate, the gear 19 will be held in engagement with the internal gear 18.

The path of movement of the crank pin end of the connecting rod of the last described construction is as shown in the Fig. 7 diagram, which is also the diagram for the construction shown in Figs. 1, and 2, as before stated.

Another feature of my invention relates to novel inlet and exhaust valves adapted particularly for an engine in which the cylinder is completely scavenged on the exhaust stroke.

According to this feature of my invention, recesses are provided in the cylinder head 25 for the inlet and exhaust valves and each valve is constructed as shown in Figs. 10 and 11 of the drawings, being formed in this instance of a curved plate 26 seating on the piston bearing face of the cylinder wall and controlling an annular port 27 cut through said wall.

Each valve plate 26 is operated by a valve stem 28 having a curved projection 29 at the valve end adapted to engage within a recess in said valve plate. In order to yieldingly press the valve 26 against its seat, flat springs 30 may be interposed between the valve and the projection 29, suitable recesses for the springs being provided in said projection.

The valve stem 28 operates in a bushing 31 and in order to prevent leakage around the valve rod from the cylinder, the projection 29 is provided with a seat 32 adapted to engage the end face of the bushing 31 when the valve is in its closed position, so that during the major portion of the compression and expansion strokes, leakage is prevented.

Each valve is normally held in the closed position by a spring 33 acting between the cylinder head 25 and the outer end of the valve stem 28.

The valves may be operated by a cam shaft 34 operatively connected to the crank shaft so as to be rotated in the usual manner, but I have provided an improved means for transmitting motion from the cam shaft to the valve stems, comprising a valve operating lever 35 formed of two parts having an interposed roller 36 mounted in suitable bearings provided in the arm sections. At one end of the valve arm sections, a roller 37 is mounted for engagement with the upper end of the valve stem 28 and the opposite ends of the arm sections are supported on a pin 38, having an eccentric portion 39 mounted in a bearing provided in the standards 40 which support the cam shaft 34.

The valve arm is made thin so as to provide a certain degree of resiliency, in order to take up for slight inequalities in the seating of the valve and the arm may be adjusted so as to take up lost motion and prevent pounding, by rotating the pin 38, the movement of the eccentric portion 39 operating to raise or lower the pin 38.

When the pin has been properly adjusted, the same is clamped in position by the clamping bolt 41.

Other constructions are possible in which the principle of employing a gear on the crank pin engaging a gear on the connecting rod is utilized, such as making the internal gear a part of the crank pin, the teeth of which are adapted to mesh with the teeth of a spur gear on the connecting rod, but I prefer the forms shown in the drawings, particularly the construction shown in Figs. 1 and 2.

Means other than the specific arrangements shown in the drawings may be employed for holding the gears in mesh, the scope of the invention being intended to include any bearing means for holding the gear on the crank pin in mesh with the gear on the connecting rod.

Having now described my invention, what I claim as new and desire to secure by Letters Patent, is:

1. In an internal combustion engine, the combination with a cylinder, a piston therein, a connecting rod, and a crank pin, of gear teeth on the crank pin and gear teeth on the connecting rod adapted to mesh with the teeth on the crank pin to effect a variable stroke of the engine.

2. In an internal combustion engine, the combination with a cylinder, a piston therein, a connecting rod, and a crank pin, of an internal gear at the crank pin end of the connecting rod and a spur gear on the crank pin adapted to mesh with the internal gear for producing a variable stroke of said piston.

3. In an internal combustion engine, the combination with a cylinder, a piston therein, a connecting rod, and a crank pin, of a spur gear on the crank pin and an internal gear at the crank pin end of the connecting rod adapted to mesh with the spur gear and having a gear ratio of three to one for producing a variable stroke of said piston.

4. In an internal combustion engine, the combination with a cylinder, a piston therein, a connecting rod, and a crank pin, of an internal gear at the crank pin end of the connecting rod, a spur gear on the crank pin meshing with the internal gear, and idler gears meshing with the internal gear and the spur gear for maintaining same in operative relation.

5. In an internal combustion engine, the combination with a cylinder, a piston therein, a connecting rod, and a crank pin, of gear teeth on the crank pin and gear teeth on the connecting rod adapted to mesh with the teeth on the crank pin.

6. In an internal combustion engine, the combination with a cylinder, a piston therein, a connecting rod, and a crank pin, of a gear on the crank pin, a gear on the connecting rod adapted to mesh with the gear on the crank pin, and bearing means for holding said gears in mesh.

In testimony whereof I have hereunto set my hand.

WALTER M. AUSTIN.